(12) United States Patent
Farhan et al.

(10) Patent No.: US 10,917,496 B2
(45) Date of Patent: Feb. 9, 2021

(54) NETWORKED STORAGE ARCHITECTURE

(71) Applicant: Amazon Technologies, Inc., Seattle, WA (US)

(72) Inventors: Munif M. Farhan, Clyde Hill, WA (US); Ahmed Mohammed Shihab, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 15/695,959

(22) Filed: Sep. 5, 2017

(65) Prior Publication Data
US 2019/0075186 A1 Mar. 7, 2019

(51) Int. Cl.
*H04L 29/08* (2006.01)
*G06F 3/06* (2006.01)
(Continued)

(52) U.S. Cl.
CPC ............ *H04L 67/322* (2013.01); *G06F 3/061* (2013.01); *G06F 3/0604* (2013.01); *G06F 3/067* (2013.01);
(Continued)

(58) Field of Classification Search
CPC ..... H04L 67/322; H04L 67/327; G06F 3/061; G06F 3/0664; G06F 3/0635; G06F 3/067; G06F 3/0631; G06F 3/0604
(Continued)

(56) References Cited

U.S. PATENT DOCUMENTS 7,154,621 B2 * 12/2006 Rodriguez ......... H04N 1/00132
358/1.15
7,496,718 B2 * 2/2009 Ohno ...................... G06F 3/061
711/114
(Continued)

FOREIGN PATENT DOCUMENTS

WO WO 2012/164632 12/2012
WO WO 2013/066482 5/2013

OTHER PUBLICATIONS

"NVM Express over Fabrics: Revision 1.0", *NVM Express, Inc.*, 49pp. (Jun. 5, 2016).
(Continued)

*Primary Examiner* — David R Lazaro
*Assistant Examiner* — Berhanu Shitayewoldetadik
(74) *Attorney, Agent, or Firm* — Klarquist Sparkman, LLP

(57) ABSTRACT

Technologies are provided for a dynamically scalable storage architecture. A workload manager can be configured to monitor compute workloads targeting network-enabled storage devices. The workload manager can identify servers to perform all or part of the compute workloads. The workload management server can configure the identified servers to establish logical connections with the network-enabled storage devices, wherein the identified servers can transmit data access commands to the network-enabled storage devices via a computer network. The identified servers can then be used to perform all or part of the compute workloads targeting the network-enabled storage devices. In at least some embodiments, the workload manager can monitor a pool of available servers, from which servers can be identified and associated with network-enabled storage devices. In a different or further embodiment, the workload manage-
(Continued)

ment server can instantiate new virtual servers and associate the virtual servers with network-enabled storage devices.

20 Claims, 10 Drawing Sheets

(51) Int. Cl.
  *G06F 9/46* (2006.01)
  *H04N 21/433* (2011.01)
(52) U.S. Cl.
  CPC .......... *G06F 3/0631* (2013.01); *G06F 3/0635* (2013.01); *G06F 3/0664* (2013.01); *H04L 67/327* (2013.01)
(58) Field of Classification Search
  USPC ........................................................ 709/220
  See application file for complete search history.

(56) References Cited

U.S. PATENT DOCUMENTS

| | | | | |
|---|---|---|---|---|
| 9,235,645 | B1* | 1/2016 | Khafizova | G06F 16/116 |
| 9,471,585 | B1* | 10/2016 | Theimer | G06F 3/0641 |
| 10,282,494 | B2* | 5/2019 | Mardikar | G06Q 10/10 |
| 2002/0124137 | A1* | 9/2002 | Ulrich | G06F 3/0613 |
| | | | | 711/113 |
| 2002/0156840 | A1* | 10/2002 | Ulrich | G06F 16/10 |
| | | | | 709/203 |
| 2003/0195962 | A1* | 10/2003 | Kikuchi | H04L 29/06 |
| | | | | 709/226 |
| 2005/0267929 | A1* | 12/2005 | Kitamura | G06F 3/061 |
| | | | | 709/201 |
| 2005/0267950 | A1* | 12/2005 | Kitamura | G06F 3/061 |
| | | | | 709/219 |
| 2007/0055840 | A1* | 3/2007 | Yamamoto | G06F 3/0635 |
| | | | | 711/165 |
| 2012/0136989 | A1* | 5/2012 | Ferris | G06F 9/4856 |
| | | | | 709/224 |
| 2012/0254547 | A1* | 10/2012 | Benhase | G06F 11/0727 |
| | | | | 711/133 |
| 2012/0311603 | A1* | 12/2012 | Kudo | G06F 3/0611 |
| | | | | 718/105 |
| 2013/0007504 | A1* | 1/2013 | Bodke | G06F 11/1423 |
| | | | | 714/4.2 |
| 2013/0018853 | A1* | 1/2013 | Jayaraman | G06F 3/0641 |
| | | | | 707/692 |
| 2013/0031136 | A1* | 1/2013 | Shah | G06F 21/6218 |
| | | | | 707/783 |
| 2013/0117448 | A1* | 5/2013 | Nahum | G06F 3/0607 |
| | | | | 709/225 |
| 2013/0117450 | A1* | 5/2013 | Medard | H04L 67/1097 |
| | | | | 709/225 |
| 2013/0262556 | A1* | 10/2013 | Xu | G06F 9/5027 |
| | | | | 709/202 |
| 2013/0290463 | A1* | 10/2013 | Myrah | G06F 3/0617 |
| | | | | 709/213 |
| 2013/0339486 | A1* | 12/2013 | Kulkarni | H04L 67/10 |
| | | | | 709/219 |
| 2014/0007189 | A1* | 1/2014 | Huynh | G06F 3/0622 |
| | | | | 726/3 |
| 2014/0096139 | A1* | 4/2014 | Alshinnawi | G06F 11/008 |
| | | | | 718/103 |
| 2014/0280667 | A1* | 9/2014 | Hildebrand | H04L 67/1097 |
| | | | | 709/213 |
| 2015/0256621 | A1* | 9/2015 | Noda | G06F 3/0605 |
| | | | | 709/226 |
| 2015/0347170 | A1* | 12/2015 | Mohammed | G06F 8/65 |
| | | | | 718/1 |
| 2016/0054783 | A1* | 2/2016 | Rajappa | G06F 1/3203 |
| | | | | 700/291 |
| 2016/0091685 | A1* | 3/2016 | Raza | G02B 6/4452 |
| | | | | 398/19 |
| 2016/0110436 | A1* | 4/2016 | Romano | G06F 16/254 |
| | | | | 707/602 |
| 2017/0090897 | A1* | 3/2017 | Veereshwara | G06F 8/65 |
| 2017/0139465 | A1* | 5/2017 | Badam | G06F 1/26 |
| 2017/0317882 | A1* | 11/2017 | Bitincka | H04L 67/06 |
| 2018/0150255 | A1* | 5/2018 | Woo | G06F 3/0635 |
| 2018/0336023 | A1* | 11/2018 | Romano | G06F 8/65 |
| 2018/0352581 | A1* | 12/2018 | Segal | H04W 72/02 |
| 2019/0073141 | A1* | 3/2019 | Brennan | G06F 11/1076 |
| 2019/0163651 | A1* | 5/2019 | Kowles | G06F 3/061 |

OTHER PUBLICATIONS

"NVM Express: Revision 1.2.1", *NVM Express, Inc.*, 217pp. (Jun. 5, 2016).
"NVM Express: Revision 1.3", *NVM Express, Inc.*, 282pp. (May 1, 2017).
International Search Report, International Application No. PCT/US2018/049366, 4 pages, dated Dec. 19, 2018.
Written Opinion, International Application No. PCT/US2018/049366, 7 pages, dated Dec. 19, 2018.

* cited by examiner

NETWORKED STORAGE ARCHITECTURE

BACKGROUND

In many storage architectures, server computers are directly connected to storage devices. For example, a storage device may be connected directly to a communication bus of the server computer. In at least some architectures, a server computer physically connected to a storage device serves as a head node for the storage device, wherein the server computer acts as an access point for the storage device. In some cases, such a server can receive requests to store and/or retrieve data from the storage device, for example over a computer network. The server can then communicate with the storage device via a communication bus of the server, to which the storage device is connected (for example, using data block-level access commands). In at least some such architectures, all data access operations (such as data storage and retrieval operations) targeting a storage device are channeled through the server computer that is directly connected to the storage device.

DETAILED DESCRIPTION

Figure 1:
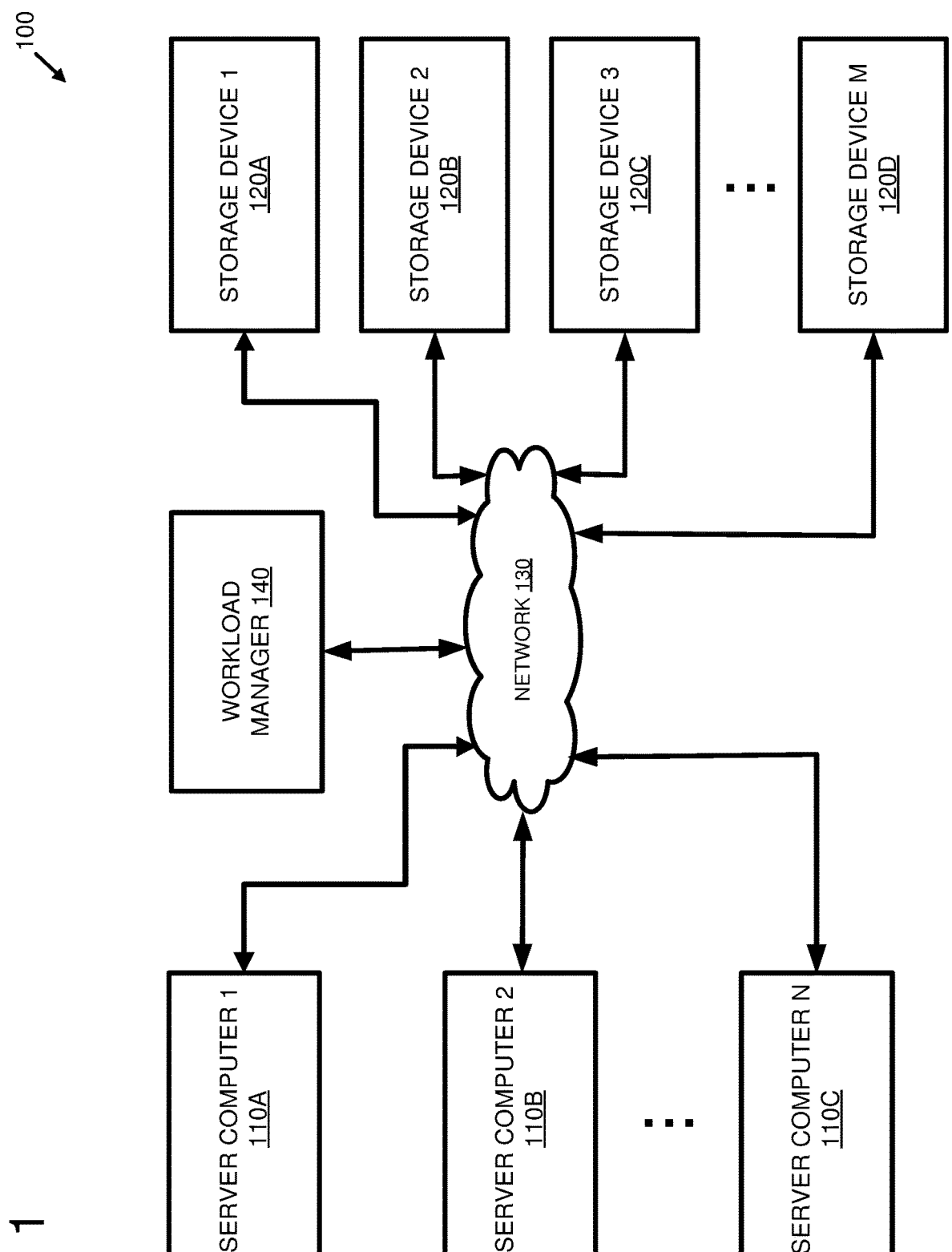
FIG. 1 is a system diagram depicting an example system configured to dynamically allocate storage workloads to network-attached server computers.

In at least some storage architectures, a server computer is physically connected to one or more storage devices. In at least some such architectures, data access operations that target one or more of the storage devices are routed through the server computer to which the one or more storage devices are directly connected. In some cases, this can lead to processing bottlenecks. For example, it is possible for high levels of data processing activity to exceed the available processing resources and/or data access resources of the server computer. However, since the one or more storage devices are directly connected to the server computer, it may not be possible to bring additional processing capability and/or data access capacity to bear without physically changing the hardware resources of the server computer. Additionally, if data processing operations being performed by the server computer would exceed an available storage capacity of the one or more storage devices, it may not be possible to increase the server's available storage capacity without directly connecting additional storage devices to the server computer.

At least some of the embodiments of the technologies described herein solve these problems by enabling server computers to be dynamically associated with network-enabled storage devices in response to changing data access and/or compute workload demands. This can provide a more flexible and scalable storage system.

For example, a server computer can be configured to transmit data block-level access commands to one or more storage devices via a computer network. The one or more storage devices can be connected to the computer network and configured to receive the data block-level access commands via the computer network. In at least some embodiments, a workload manager can be configured to analyze a compute workload targeting one or more of the network-enabled storage devices and to dynamically associate one or more of the server computers with the one or more network-enabled storage devices. The one or more server computers can be configured to perform all or part of the compute workload targeting the one or more network-enabled storage devices and to transmit data block-level access commands to the one or more network-enabled storage devices via the computer network.

In at least some embodiments, the workload manager can be configured to manage a pool of available servers. In response to receiving a request to perform a data processing job targeting a storage device, the workload manager can search the pool of available servers for one or more servers with available processing and/or data access capacity for performing all or part of the data processing job. The workload manager can associate the identified one or more servers with the targeted storage device, and the one or more servers can perform all or part of the data processing job, wherein the performing all or part of the data processing job comprises transmitting one or more block-level access commands to the targeted storage device via a computer network. In at least some such embodiments, one or more of the servers in the available server pool are virtual servers (such as virtual machines, virtualization containers, etc.) running on one or more network-attached server computers.

In a different or further embodiment, the workload manager is configured to detect that a number of servers in the available server pool has fallen below a specified threshold, and to add one or more servers to the pool of available servers. Adding the one or more servers to the pool of available servers can comprise identifying one or more underutilized servers in the computer network, and adding the one or more underutilized servers to the available server pool. Additionally or alternatively, adding the one or more servers to the pool of available servers can comprise instantiating one or more virtual servers and adding the newly instantiated virtual servers to the pool of available servers.

FIG. 1 is a system diagram depicting an example system 100 configured to dynamically allocate storage workloads to one or more network-attached server computers 110A-C.

The example system 100 comprises one or more server computers 110A-C connected to a computer network 130. The example system 100 further comprises one or more storage devices 120A-D connected to the computer network 130. The numbers of server computers 110 and storage devices 120 are provided for illustration purposes and are not intended to be limiting. Larger and/or smaller numbers of server computers 110 and/or storage devices 120 are also possible.

A storage device (e.g., 120A-D) connected to the network 130 can be configured to receive data block access requests over the computer network 130 from one or more of the server computers 110A-C. For example, a storage device (e.g., 120A-D) can comprise a storage medium (not shown) and a network interface (not shown). Such a storage device can be configured to receive data block access requests over the computer network 130 via the network interface. The data block access requests and be processed by the storage device by accessing one or more data blocks stored on the storage medium.

A server computer (e.g., 110A) can be configured to transmit one or more data access block requests to one or more of the storage devices 120A-D via the computer network 130. For example, the server (e.g., 110A) can comprise one or more processors (not shown) and a network interface (not shown). Such a server computer can be configured to transmit the data block access requests to one of the storage devices 120 A-D over the computer network 130 via the network interface. Example data block access requests include request to perform data access operations (such as data write operations and/or data read operations, etc.) that target one or more data blocks of one or more storage media of the storage device (e.g., 120A). The data block access requests be defined by one or more protocols that enable the transmission of block-level storage manipulation commands over a computer network transport layer. In a particular embodiment, one or more of the storage devices 120A-D are solid state storage devices configured to support a non-volatile memory express over fabrics protocol (e.g., NVMe over Fabrics 1.0).

The example system 100 further comprises a workload manager 140. The workload manager 140 can be configured to determine a compute power to data storage ratio for a compute workload targeting one or more of the storage devices 120A-D. Example compute workloads include data processing jobs targeting data stored on one or more storage media of one or more of the storage devices 120A-D (such as data storage and/or retrieval operations, data streaming operations, data analytics operations, data migration operations, storage device maintenance operations, etc.). Determining the compute power to data storage ratio can comprise determining an approximate amount of data that will be accessed during the processing of the compute workload, determining an approximate processor utilization that will be required to perform the compute workload, and calculating the ratio between the approximate processor utilization and the approximate amount of data to be accessed.

The workload manager 140 can be configured to allocate one or more of the server computers 110A-C to the compute workload. Allocating a server to the compute workload can comprise configuring the server to perform at least part of the compute workload targeting the one or more of the storage devices 120A-D. Performing the at least part of the compute workload can comprise transmitting one or more data block access requests to one or more of the storage devices 120A-D via the computer network 130.

In at least some embodiments, allocating a server to the compute workload comprises configuring the server to act as a head node for one or more of the storage devices 120A-D targeted by the workload. One or more applications servers can be configured to interact with the server computer via the computer network 130 as if it was a data storage provider connected directly to the one or more of the storage devices 120A-D. The server computer can be configured to receive one or more data access requests from one or more of the applications servers and to process the received one or more data access requests, at least in part, by transmitting one or more data block-level access requests to the one or more storage devices 120A-D via the network 130.

The workload manager 140 can comprise one or more computer software and/or hardware components. For example, the workload manager 140 can comprise one or more processors, memories, and/or software modules. In a different or further embodiment, the workload manager 140 can comprise a system-on-a-chip (SOC), an application-specific integrated circuit (ASIC), and/or a field-programmable gate array (FPGA). In at least some embodiments, the workload manager 140 can comprise a network interface connected to the computer network 130.

The workload manager 140 can be configured to monitor a pool of servers comprising one or more of the server computers 110A-C via the network 130. In at least some embodiments, the workload manager 140 is configured to monitor processor utilizations of the server computers 110A-C, wherein a processor utilization for a server indicates a current, average, and/or approximate amount of available processing capability of the server that is actively being utilized by processing operations. The workload manager 140 can be configured to detect that the processor utilization of one of the servers 110A-C is below a specified threshold and to add the server to the pool of available servers. In such an embodiment, allocating one or more of the servers 110A-C to the compute workload can comprise identifying the server in the pool of available servers and/or determining, using the processor utilization of the server, that the server has an available processing capacity for performing the compute workload.

In at least one embodiment, the workload manager 140 can be configured to allocate more than one of the server computers 110A-C in the available server pool to the compute workload. For example, for a given compute workload, no single server in the available server pool may have an available processing capacity that is sufficient for performing all of the compute workload. In such a scenario, the workload manager 140 can allocate more than one of the servers in the server pool that, in combination, have available processing capacities sufficient for performing the compute workload.

In at least one embodiment, one or more of the servers 110 A-C comprise one or more virtual servers (such as virtual machines, virtualization containers, etc.). In such an embodiment, allocating a server to the compute workload can comprise allocating one or more of the virtual servers to the compute workload. In at least some cases, the workload manager 140 can be configured to instantiate one or more of the virtual servers running on the one or more of the server computers 110A-C.

For example, the workload manager 140 can be configured to monitor a pool of virtual machines that the workload manager 140 determines to be underutilized. Determining that a given virtual machine is underutilized can comprise monitoring an available processing capacity of the virtual machine, and determining that the available processing capacity as above a specified threshold and/or that an average available processing capacity of the virtual machine has been above the specified threshold for a specified period of time. If the workload manager 140 determines that a given virtual machine is underutilized, the workload manager 140 can add the virtual machine to the pool of underutilized virtual machines. In such an embodiment, allocating a server to the compute workload can comprise identifying a virtual machine in the pool of underutilized virtual machines with an available processing capacity sufficient for performing all or part of the compute workload, and allocating the identified virtual machine to the compute workload.

In at least some cases, the workload manager 140 can be configured to monitor the pool of underutilized virtual machines and to determine that a number of virtual machines in the pool of underutilized virtual machines is below a specified threshold. Responsive to such determination, the workload manager 140 can be configured to instantiate one or more additional virtual machines on one or more of the server computers 110 A-C and to add the instantiated one or more virtual machines to the pool of underutilized virtual machines. In a scenario where compute resources on the server computers 110 A-C are not sufficient to support additional virtual machine instances, additional server computers can be provisioned and attached to the network 130. The workload manager 140 can be configured to detect the newly provisioned server computers and to instantiate one or more additional virtual machines on the newly provisioned server computers.

In at least one embodiment, the workload manager 140 can be configured to determine a latency sensitivity requirement of the compute workload. The latency sensitivity requirement can indicate an extent to which network latency can impact an effective performance of the compute workload. For example, in some cases real-time data access operations can be considered to be more sensitive to latency than off-line operations (such as data analytics operations, etc.). Expected data access rates can also affect a latency sensitivity requirement of the compute workload. For example, an average expected access time for a storage device comprising a solid state storage medium may be lower than an average expected access time for storage device comprising a hard disk drive or a tape drive.

The workload manager 140 can be configured to determine average network latencies between the server computers 110A-C and the one or more of the storage devices 120A-D that is/are targeted by the compute workload. Determining an average network latency can comprise requesting a server computer to transmit one or more messages to a storage device and measuring an average time that elapses before responses are received. Additionally or alternatively, network latency determination may be provided by one or more networking protocols of the computer network 130.

Allocating one of the servers 110 A-C to the compute workload can comprise determining that a network latency of the server with respect to the one or more storage devices targeted by the compute workload satisfies the latency sensitivity requirement of the compute workload. In a particular embodiment, determining that a network latency of a server with respect to a storage device targeted by the compute workload satisfies the latency sensitivity requirement of the compute workload comprises determining that the server and the storage device are connected to a same network switch (e.g., the same top-of-rack switch).

In any of the examples described herein, a storage device can be a device capable of storing data in one or more physical storage media. For example, the storage device can be a magnetic storage device, such as a hard disk drive, that is capable of storing data in one or more magnetic recording formats. Other examples of storage devices include solid state storage devices (such as NAND-type flash devices, NOR-type flash devices, etc.), and random access data storage devices (such as DRAM devices). Further examples of storage devices include non-volatile dual in-line memory modules (NVDIMMs).

In some embodiments, the storage device comprises multiple disparate storage media. For example, the storage device can be a hard disk drive that comprises one or more magnetic disks and an internal memory. In another example, the storage device comprises solid state storage and magnetic storage. In another example the storage device comprises multiple magnetic disks organized as a Redundant Array of Independent Disks (RAID). Other combinations of disparate storage media are also possible.

In any of the examples described herein, a network-enabled storage device can comprise a storage device connected to a computer network and configured to receive data block-level access commands from one or more computing devices via the computer network connection.

In any of the examples described herein, a storage device can comprise a storage device controller. A storage device controller can comprise one or more hardware components of the storage device. The storage device controller can comprise a firmware stored in a read-only memory (ROM) of the storage device, a storage medium of the storage device, or some combination thereof. Additionally or alternatively, the storage device controller can be implemented at an intermediate layer between an application and the storage device. Such an intermediate layer controller can comprise software (such as a driver) and one or more processors, a system-on-chip (SoC), a field-programmable gate array (FPGA), and/or an application-specific integrated circuit (ASIC). In at least some embodiments, such an intermediate layer controller can be implemented as part of storage device enclosure as described here, and/or a server computer, as described herein.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), which is used by external components to identify and access the data block. By using logical addresses, the physical storage locations of data blocks in the storage device can change without having to notify or update any external components. A storage device that supports data blocks can be configured to process block-level access commands. Such block-level access commands can comprise commands to store and/or retrieve one or more identified data blocks on one or more storage media of the storage device.

In any of the examples described herein, a server computer can be a computing device that comprises a processor and is connected to a computer network. The server computer can be configured to establish a logical connection (such as a network connection) with a network-enabled storage device. The server computer can be configured to transmit data block-level access commands (e.g., commands to perform data block read and/or write operations, etc.), or the like, to the storage device via the computer network. The server computer can be configured to receive command responses from the storage device via the computer network. In at least some scenarios, the server computer can be logically connected to more than one network-enabled storage device. Additionally or alternatively, more than one server computer can be logically connected to a same network-enabled storage device.

In some embodiments, the server computer can be configured to act as a head node for one or more network-enabled storage devices. In at least some embodiments, the server computer can be a computing device configured to provide a unified access point for multiple network-enabled storage devices.

Figure 2:
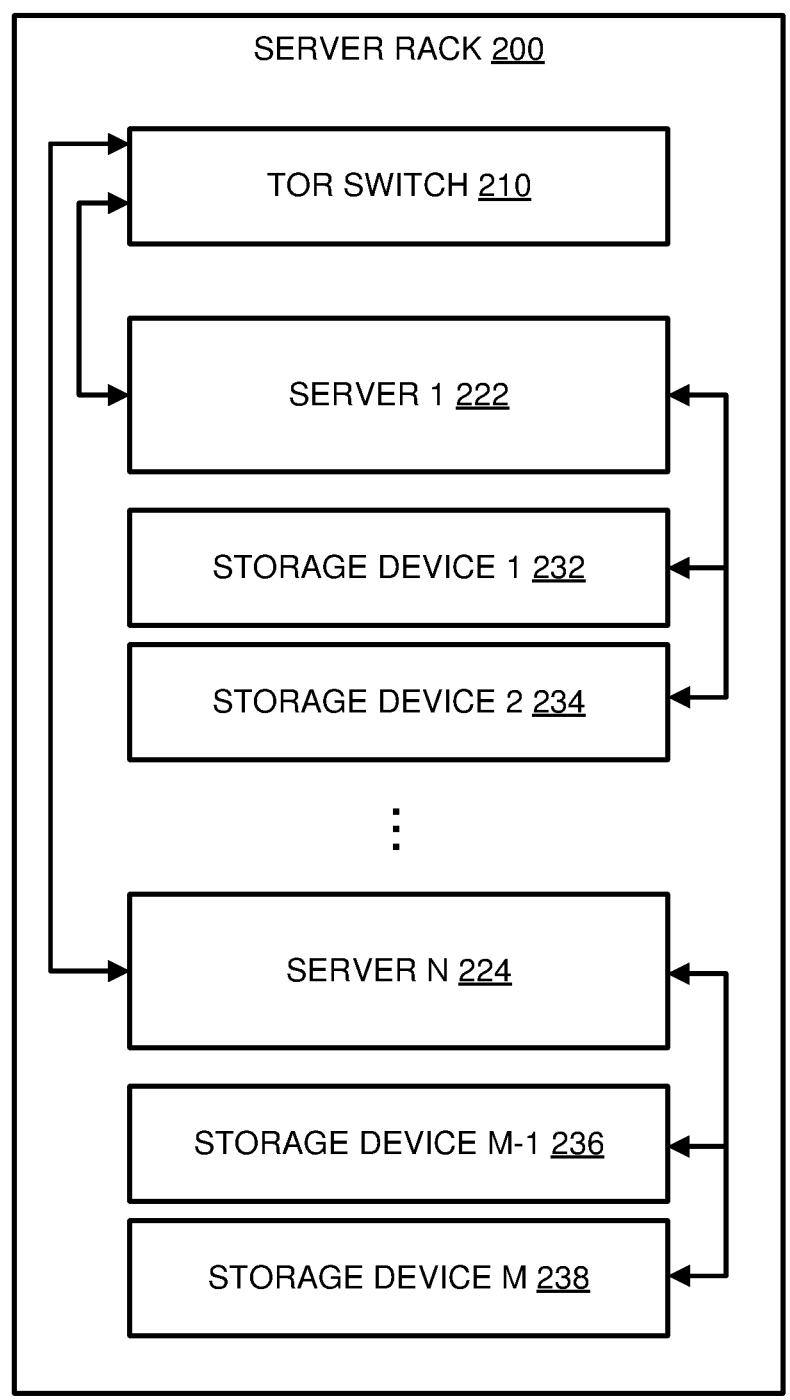
FIG. 2 is a system diagram depicting an example server rack comprising server computers and storage devices.

FIG. 2 is a system diagram depicting a server rack 200 comprising server computers 222-224 and storage devices 232-238. The server rack 200 comprises a top-of-rack switch 210 connected to the server computers 222-224. The server computers 222-224 are connected to one or more of the storage devices 232-238. For example, the server 222 is depicted as being connected to the storage devices 232 and 234, and the server 224 is depicted as being connected to the storage devices 236 and 238. The connections between the server computers and the storage devices comprise physical connections, such as communication bus connections (serial bus connections, parallel bus connections, etc.). Example parallel bus connections include PCI bus connections, etc. Example serial bus connections include SATA bus connections, PCIe bus connections, USB connections, etc.

The server computers 222-224 are configured to receive data access requests via the top-of-rack switch 210. The server computers 222-224 are configured to transmit block-level access commands to their respective connected storage devices via the physical bus connections. In such a configuration, the number of server computers connected to a given storage device is fixed, and cannot change without a change to the physical connections between the storage device and one or more of the server computers 222-224. Similarly, a number of storage devices connected to a given server computer is fixed and cannot change without a change to the physical connections between the server computer and one or more storage devices.

Figure 3:
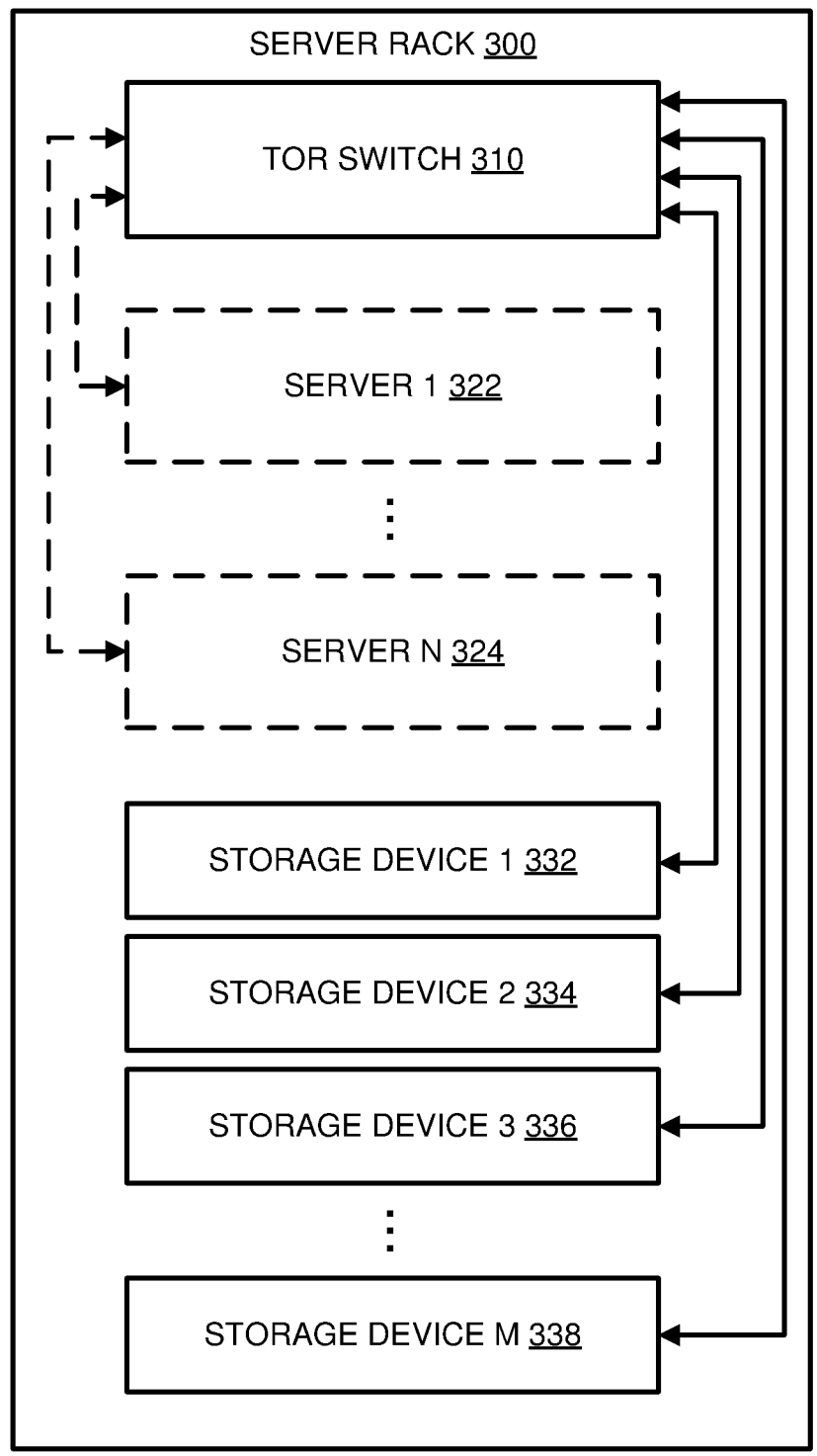
FIG. 3 is a system diagram depicting an example server rack comprising network-enabled storage devices.

FIG. 3 is a system diagram depicting an example server rack 300 comprising one or more network-enabled storage devices 332-338 connected to a top-of-rack switch 310. The storage devices 332-338 can comprise network interfaces through which the storage devices 332-338 are connected to the top-of-rack switch 310. The storage devices 332-338 can be configured to receive network communications via the top-of-rack switch 310. The network communications can comprise one or more data block-level access commands transmitted via a network transport layer protocol. For example, one or more of the storage devices 332-338 can be configured to receive data block-level access commands from one or more servers via the top-of-rack switch 310.

The top-of-rack switch 310 can comprise one or more uplink ports (not shown) by which the top-of-rack switch 310 can be connected to a broader area network. The broader area network can comprise one or more server computers and a workload manager. The workload manager can be configured to associate one or more of the server computers with one or more of the storage devices 332-338 in the server rack 300. An associated server computer can be configured to transmit data block-level access requests to the one or more storage devices 332-338 in the server rack 300 via the top-of-rack switch 310.

Optionally, the server rack 300 can comprise one or more server computers 322-324. The one or more server computers 322-324 can be connected to the top-of-rack switch 310. In at least some embodiments, one or more of the server computers 322-324 can be associated with one or more of the storage devices 332-338 by a workload manager in the broader area network to which the top-of-rack switch 310 is connected. In such an embodiment, one or more of the server computers 322-324 can transmit one or more data block-level access commands to the one or more associated storage devices via the top-of-rack switch 310.

In at least some embodiments, one or more of the storage devices 332-338 can be stored within a storage device enclosure (not shown). For example, one of the storage devices 332-338 can be contained within a storage device enclosure and connected to a storage device access controller of the storage device enclosure. In such an embodiment, a network interface of the storage device enclosure can be connected to a port of the top-of-rack switch 310 (such as a down link port of the top-of-rack switch 310). The storage device access controller can be configured to receive data block access commands via the network interface of the storage device enclosure and to process the received data block access commands by accessing one or more data blocks stored on one or more storage media of the storage device contained within the storage device enclosure.

Figure 4A:
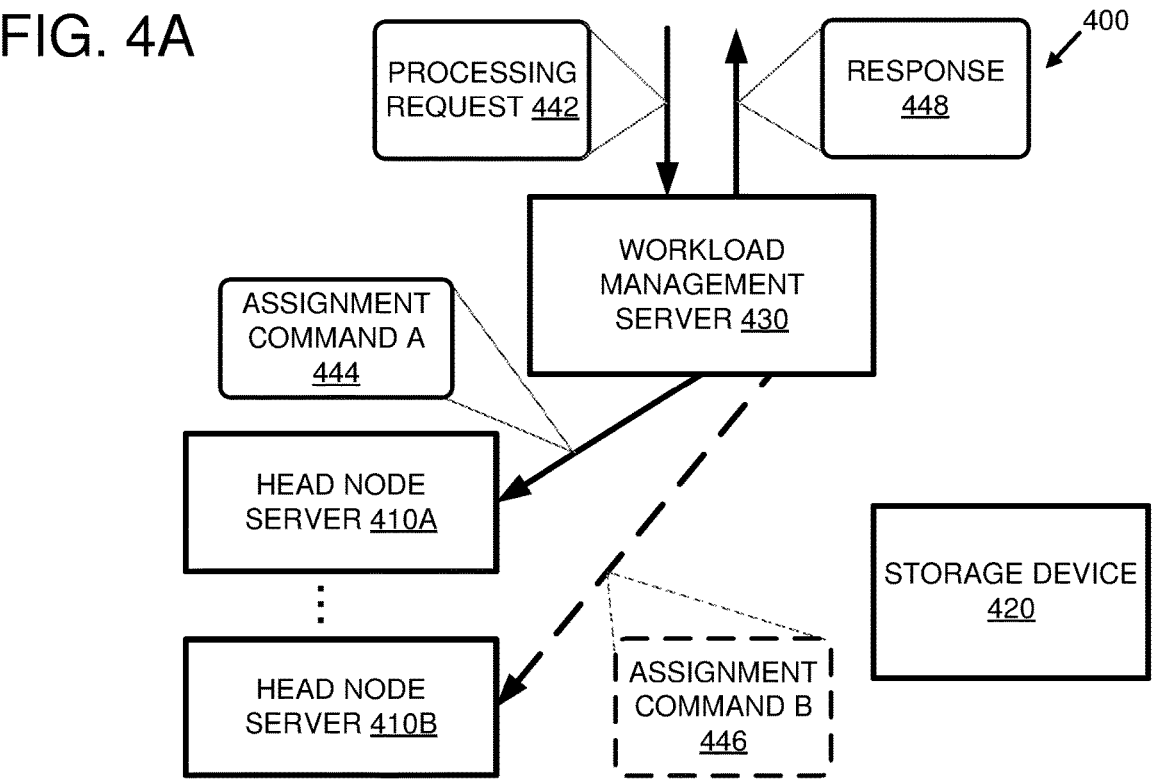
FIGS. 4A-B are system diagrams depicting an example system configured to dynamically assign head node servers to a storage device.

FIG. 4A is a system diagram depicting an example system 400 comprising a workload management server 430 configured to dynamically assign one or more head node servers 410A-B to a network-enabled storage device 420. The head node servers 410A-B, the workload management server 430, and the storage device 420 are connected to a computer network (not shown). In at least some embodiments, the storage device 420 can comprise a storage device enclosure connected to the computer network, wherein the storage device enclosure comprises a network interface and one or more storage media configured to store data.

In any of the examples described herein, a head node server (or head node) can be a server computer or other computing device configured to provide data access and/or data manipulation services for one or more storage devices. For example, a head node server can expose one or more services that can be used by other applications to access and/or manipulate data stored in one or more of the storage devices. In at least some embodiments, one or more of the head node servers 410A-B can comprise one or more virtual machines that host one or more of the services. In such embodiments, the workload manager 430 can be configured to instantiate one or more of the virtual machines.

The workload management server 430 can be configured to receive a request 442 to perform a data processing job targeting the storage device 420. The request 442 can comprise a description of the data processing job. The description of the data processing job can comprise a type of the data processing job (e.g., real-time data access, data analytics, storage device maintenance, data streaming, batch process, etc.). In at least some embodiments, the description of the data processing job can describe one or more particular commands and/or operations to be performed as part of the data processing job. In at least some embodiments, the processing request 442 can comprise an identifier of the storage device 420 that is targeted by the processing job. In a different or further embodiment, the processing request 442 can comprise one or more identifiers of data that are targeted by the data processing job (such as data object identifiers, data item identifiers, etc.). In such an embodiment, the workload management server 430 can be configured to determine that the identified data are stored on the storage device 420. (Although a single storage device 420 is depicted in FIG. 4A, in at least some embodiments it is possible for the data that is targeted by the processing job to be stored on multiple storage devices.)

The description of the data processing job can comprise a processing requirement of the data processing job. For example, the description of the data processing job can comprise an estimated and/or average amount of processing capability required to perform the data processing job. Additionally or alternatively, the workload management server 430 can be configured to determine a processing requirement of the data processing job. For example, the workload management server 430 can be configured to determine an estimated amount of processing capability (such as an estimated number of processor cycles, an estimated number of computer operations and/or data access operations, etc.) required to perform the requested data processing job. In a particular embodiment, different data processing job operations are associated with predetermined estimated processing requirements in a data structure (such as a table, etc.) that is accessible by the workload management server 430.

The workload management server 430 can be configured to identify a head node server, of the head node servers 410A-B, that has available processing resources for performing all or part of the data processing job. For example, the workload management server 430 can be configured to monitor processor utilizations for the head node servers 410A-B and to identify one of the head node servers with an available processing capacity that satisfies all or part of the processing requirement for a data processing job.

The workload management server 430 can be configured to transmit an assignment command to the identified head node server. For example, in FIG. 4A the workload management server 430 is depicted as transmitting an assignment command 444 to the head node server 410A. The assignment command can comprise an identifier of the storage device 420 (such as a network address of the storage device 420, an identifier with which the head node server can look up a network address for the storage device 420, etc.).

The head node server (e.g., 410 A) can be configured to process the assignment command (e.g., 444) by establishing a logical connection with the storage device 420. For example, the head node server (e.g., 410 A) can be configured to transmit block-level access commands to the storage device 420 via the computer network. In a particular embodiment, an operating system of the head node server can expose the storage device 420 to applications running on the head node server (and/or applications running on one or more other servers connected to the computer network). In at least some embodiments, the operating system of the head node server (and/or one or more drivers or other applications running on the head node server) is configured to portray the storage device 420 as being physically connected to the head node server. Upon receipt of a request to access the storage device 420, the operating system of the head node server (and/or one or more drivers or other applications running on the head node server) can be configured to transmit one or more block-level data access commands to the storage device 420 via the computer network. In an embodiment where the head node server comprises a virtual machine, the virtual machine can be configured to transmit one or more of the block-level access commands to the storage device 420 via a network interface of the head node server.

In at least some embodiments, the workload management server 430 can be configured to determine that no single head node server, of the head node servers 410A-B, has an available processing capacity for performing the data processing job. In such a scenario, the workload management server 430 optionally can assign more than one of the head node servers 410A-B to the storage device 420 targeted by the data processing job. For example, FIG. 4A depicts the workload management server 430 as optionally transmitting an assignment command 446 to the head node server 410B to assign the head node server 410B to the storage device 420.

In at least one embodiment, the workload management server 430 is configured to determine that a processing requirement of the data processing job exceeds an available processing capacity of the head node server 410A, and to assign the head node server 410B to the storage device 420, wherein assigning the head node server 410B to the storage device 420 comprises configuring the head node server 410B to transmit block-level access commands to the storage device 420 via the computer network. In at least some such embodiments, the two head node servers 410A and 410B can be used to perform all or part of the data processing job targeting the storage device 420.

In at least some cases, the workload management server 430 can be configured to determine that one of the head node servers 410A-B is already associated with the storage device 420 targeted by the data processing job. In such a scenario, the workload management server 430 can analyze an available processing capacity of the head node server assigned to the storage device 420 to determine whether the assigned head node server has an available processing capacity for performing the data processing job. If the assigned head node server has an available processing capacity, the workload management server 430 can determine that no subsequent assignments of head node servers to the targeted storage device 420 are necessary and the assigned head node server can be used process the data processing job targeting the storage device 420. If the assigned head node server does not have an available processing capacity, the workload management server 430 can assign one or more additional head node servers, with available processing capacity, to the storage device 420. The workload management server 430 can configure the one or more additional head node servers to perform all or part of the data processing job.

The workload management server 430 can be configured to transmit a response 448 to the transmitter of the processing request 442. The response 448 can identify the one or more of the head node servers 410 A-B that is/are assigned to the storage device 420 that is targeted by the data processing job. The identified one or more head node server can subsequently be used to perform all or part of the data processing job.

In at least some embodiments, the workload management server 430 is configured to determine that a storage requirement of the data processing job exceeds an available storage capacity of a storage medium of the storage device 420. For example, the workload management server 430 can be configured to monitor an available storage capacity of the storage device 420. The workload management server 430 can analyze one or more data storage requirements of the data processing job. In at least some cases, such data storage requirements can be provided as part of the processing request 442. Additionally or alternatively, the workload management server 430 can be configured to determine such storage capacity requirements based on an operation type of the data processing job. The workload management server 430 can analyze the available capacity of the storage device 420 to determine if the available storage capacity is sufficient to satisfy the storage requirement of the data processing job. If the workload management server 430 determines that the available storage capacity is not sufficient, the workload management server 430 can assign a head node server, of the head node servers 410A-B, that is assigned to the storage device 420 to an additional storage device with available storage capacity (not shown).

For example, the workload management server 430 can identify another network-enabled storage device with an available storage capacity sufficient to satisfy a portion of the storage requirement of the data processing job that cannot be satisfied by the storage device 420. The workload management server 430 can then configure the head node server (e.g., 410A) to transmit block-level access commands to the second storage device via the computer network. In at least one embodiment, the second storage device comprises a storage enclosure comprising one or more storage media. In such an embodiment, configuring the head node server to transmit block-level access commands to the second storage device can comprise configuring the head node server to transmit the block-level access commands to one or more of the storage media in the storage device enclosure via the computer network.

For example, the workload management server 430 can determine that the storage device 410 does not have sufficient available storage capacity to perform all of the data processing job. The workload management server 430 can determine that the head node server 410A is assigned to the storage device 420 for the purposes of performing data processing jobs that target the storage device 420. The workload management server 430 can identify another storage device connected to the computer network that has available storage capacity, wherein the another storage device in combination with the storage device 420 have sufficient storage capacity for performing the data processing job. The workload management server 430 can then transmit an assignment command to the head node server 410A to assign the head node server 410A to the another storage device, such that the head node server 410A is assigned to both the storage device 420 and the another storage device. In such an embodiment, performing the data processing job can comprise using the head node server 410A to store data in one or more storage media of the storage device 420 and to store additional data in one or more storage media of the another storage device.

Figure 4B:
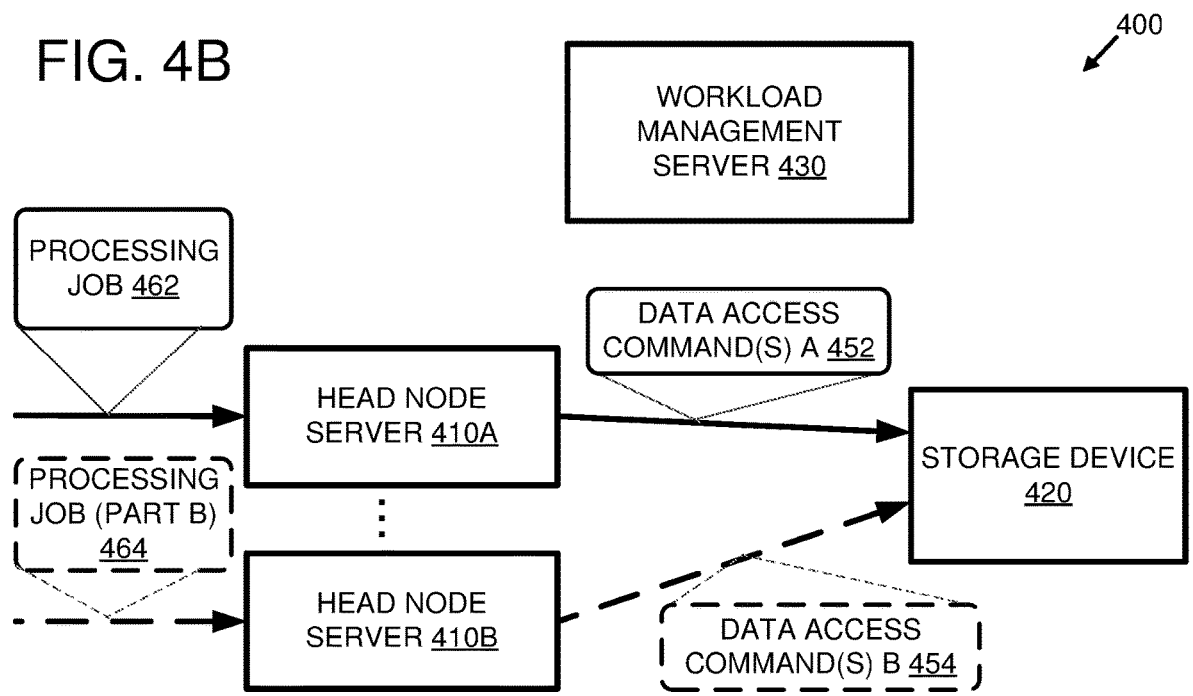

FIG. 4B is a system diagram depicting the example system 400, wherein the one or more of the head node servers 410A-B are configured to process the data processing job using the network-enabled storage device 420.

After the head node server 410A has processed the assignment command 444 (depicted in FIG. 4A), and is logically connected to the storage device 420, the head node server 410A can be configured to process all or part of the data processing job by transmitting one or more data block-level access commands 452 to the storage device 420 via the computer network. In at least some embodiments, data access and/or manipulation operations 462 that are part of the data processing job are transmitted to the head node server 410A via the computer network from one or more applications servers (not shown). For example, an application server can be configured to transmit the processing request 442 to the workload management server 430 and to receive the response 444, indicating an identity (such as a network address) of the head node server 410A to use in accessing data stored on the storage device 420. The application server can then transmit the processing job operations 462 to the head node server 410A via the computer network. In a different or further embodiment, a processing job description, describing the data processing job, can be transmitted from the workload management server 430 to the head node server 410A. Upon receipt of such a processing job description, the head node server 410A can be configured to perform the data processing job by performing one or more data processing operations, and/or transmitting the one or more data access commands 452 to the storage device 420. In at least some such embodiments, the head node server 410A can be configured to transmit results of the data processing job to an application server, the workload management server 430, one or more other servers connected to the computer network, or some combination thereof.

In embodiments where more than one head node server is assigned to the storage device 420, different parts of the data processing job can be distributed across the multiple head node servers connected to the storage device 420. For example, in an embodiment where the head node server 410A and the head node server 410B are both assigned to the storage device 420, the head node server 410A can receive part of the processing job 462 and the head node server 410B can receive another part of the processing job 464. Both the head node server 410A and the head node server 410B can transmit data access commands 452 and 454, respectively, to the storage device 420 via the computer network, and can perform separate processing operations in order to perform their respective parts of the data processing job.

In such a distributed configuration, partial results of the data processing job can be transmitted by the separate head node servers to an application server from which the parts of the data processing job are received, the workload management server 430, one or more other servers connected to the computer network, or some combination thereof. In a different or further embodiment, results of the data processing operation can be stored on the storage device 420. In a particular example, portions of the processing job can be distributed across multiple head node servers connected to the storage device 420 using a map-reduce processing configuration.

In at least some embodiments, data coherency can be a consideration when distributing parts of the data processing job across the multiple head node servers connected to the storage device 420. For example, a single head node server may be assigned to write data to the storage device 420, while one or more head node servers may be assigned to read data from the storage device 420. Additionally or alternatively, write access to the storage device 420 can be coordinated among the multiple head nodes to ensure that a single head node server has exclusive write access at any given time.

The workload management server 430 can be configured to monitor processor utilizations of the one or more head node servers connected to the storage device 420. The workload management server 430 can determine that a processor utilization for one of the one or more head node servers connected to the storage device 420 is below a specified threshold, and can remove the assignment of the head node server to the storage device. In at least some embodiments, the workload management server 430 can be configured to assign the head node server to an available server pool. The workload management server 430 can be configured to search the available server pool for a server with available processing capacity for performing one or more subsequent data processing jobs.

Thus, using at least some of the techniques described herein, head node servers can be dynamically assigned, and re-assigned, to storage devices based on current operational demand in the example system 400.

Figure 5:
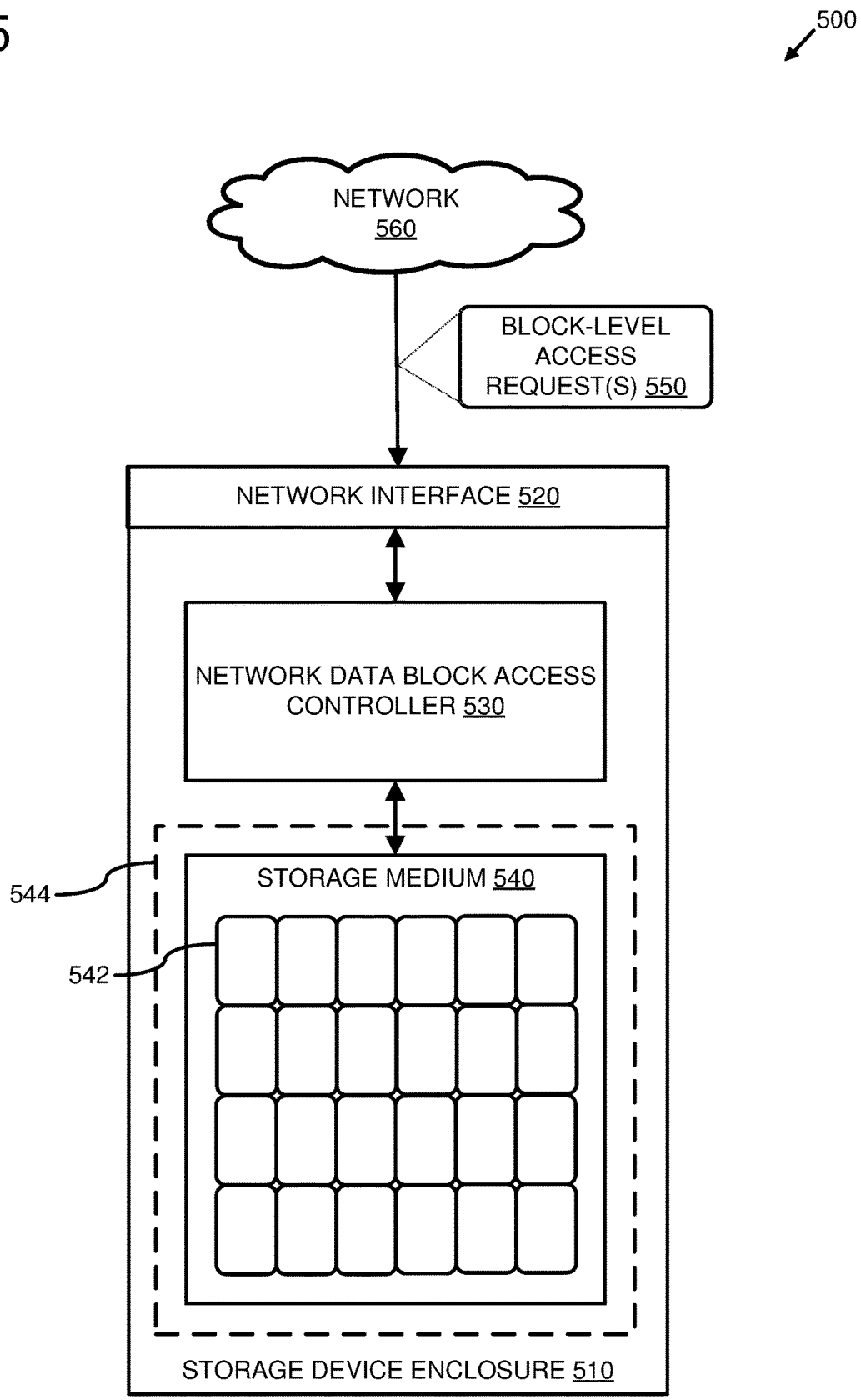
FIG. 5 is a system diagram depicting an example system comprising a network-enabled storage device.

FIG. 5 is a system diagram depicting an example system 500 comprising a network-enabled storage device enclosure 510. The example storage device enclosure 510 can be used as a storage device in any of the examples described herein. The storage device enclosure 510 comprises a network interface 520 connected to a computer network 560. The storage device enclosure 510 comprises a network data block access controller 530 configured to receive one or more block-level access requests 550 from one or more servers (not shown) connected to the computer network 560 via the network interface 520. The network data block access controller 530 can be configured to process the one or more received block-level access requests 550. Processing a block-level access request can comprise accessing one or more data blocks (e.g., 542) in a storage medium 540 contained within the storage device enclosure 510. The network data block access controller 530 can comprise one or more integrated circuits (such as one or more ASIC's, SoC's, FPGA's, etc.). Additionally or alternatively, the controller 530 can comprise one or more software components (such as one or more firmware modules, etc.).

In at least some embodiments, the network data block access controller 530 can be configured to transmit a block-level access response via the network interface 520. For example, the block-level access requests 550 can comprise one or more data access commands that are part of a block-level data access protocol the can be transmitted over a transport layer via the computer network 560. Such block-level data access commands can identify logical block addresses associated with one or more of the data blocks (e.g., 542) in the storage medium 540. In at least some embodiments, the network data block access controller 530 can be configured to access the data blocks associated with the logical block addresses identified in the block-level data access commands. Subsequent to processing the one or more block-level access requests 550, the network data block access controller 530 can transmit one or more block-level access responses (not shown). A block-level access response can comprise data stored in one or more data blocks identified in one or more of the block-level access requests and/or notifications that one or more requested data operations have/not been performed.

Optionally, the storage device enclosure 510 can comprise a removable storage device 544 that comprises the storage medium 540. In such an embodiment, the storage device enclosure 510 can comprise one or more hardware and/or software components that make up the network interface 520 and the network data block access controller 530, as well as a physical connector (such as a parallel bus connector, a serial bus connector, etc.) that can be connected to the removable storage device 544. The network data block access controller 530 can be configured to interface with the removable storage device 544 via the physical connector. For example, the network data block access controller 530 can be configured to receive the block-level access requests 550 via the network interface 520 and to transmit one or more block-level access commands to the storage device 544 via the physical connector. The network data block access controller 530 can receive responses to the block-level access commands via the physical connector, and transmit responses to the block-level access requests 550 over the network 560 via the network interface 520. Such responses to the block-level access commands can include data stored in data blocks (e.g., 542) of the storage medium 540 contained in the storage device 544. In at least some embodiments, the removable storage device 544 can comprise a storage device controller (not shown) configured to receive the block-level access commands via the physical connector and to access data stored in the data blocks (e.g., 542) of the storage medium 540.

Figure 6:
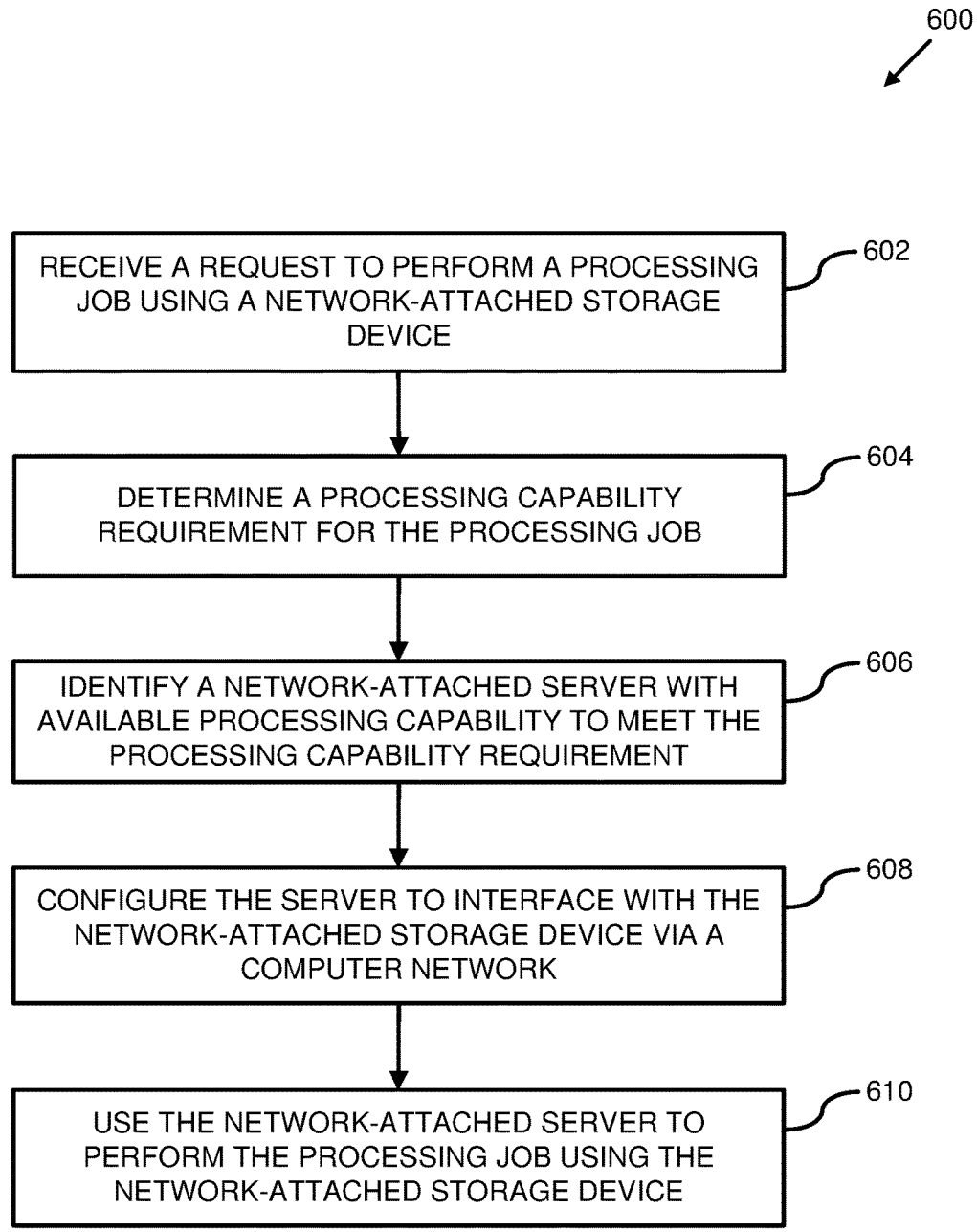
FIG. 6 is a flowchart of an example method for using a network-attached server and a network-enabled storage device to perform a processing job.

FIG. 6 is a flowchart of an example method 600 for using a network-attached server and a network-enabled storage device to perform a processing job. Any of the example systems described herein can be used to perform the example method 600. For example, all or part of the example method 600 can be performed by a workload management server and/or one or more other network-attached server computers comprising a workload manager.

At 602, a request is received to perform a processing job using a network-enabled storage device. The request can comprise an identifier for the network-enabled storage device, such as a network address (e.g., a MAC addresses, an IP address, etc.). Additionally or alternatively, the request can comprise a unique identifier (e.g., a serial number, a storage device enclosure identifier, etc.) for the network-enabled storage device. In at least some embodiments, the unique identifier can be used to locate a network address for the network-enabled storage device.

In at least some embodiments, the request to perform the processing job can comprise a request for an identification of one or more head node servers that can be used to access the network-enabled storage device. Additionally or alternatively, the request can comprise a description of one or more operations to be performed as part of the processing job. Example operations can include online data access operations, offline analytics operations, storage device maintenance operations, data streaming operations, etc. In at least some embodiments, the request can comprise an amount of data (and/or an estimated amount of data) that will be accessed and/or stored in the network-enabled storage device during the performance of the processing job.

At 604, a processing capability requirement for the processing job is determined. The processing capability requirement can comprise an amount of processing capability and/or a number of dedicated processing units and/or cores that are required to perform the operations of the processing job. The processing capability requirement can be determined using the description of the one or more operations to be performed as part of the processing job. In at least some embodiments, the processing capability requirement can be modeled as a ratio of required processing capability to required data storage access. For example, the request can comprise the description of an amount of data in the network-enabled storage device to be accessed, processing operations to be performed using the accessed data, and/or an expected time for completion of the processing job (such as a maximum acceptable latency, a total expected runtime, etc.). Using such information, an average and/or maximum rate of data access can be determined along with an average and/or maximum processing time. In such an embodiment, the processing capability requirement can comprise these one or more data access rates and one or more processing times, and/or one or more ratios calculated using these one or more data access rates and one or more processing times. Additionally or alternatively, the processing capability requirement can comprise the expected time for completion of the processing job.

In at least some embodiments, one or more network-attached servers can be considered as dedicated processing resources for the network-enabled storage device. For example, when the network-enabled storage device is provisioned, a network-attached server in a same local area network as the network-enabled storage device can be assigned to act as a head node server for the network-enabled storage device using techniques described herein. The selection of such a "default" head node server for the network-enabled storage device can be based on various criteria such as a network latency of the "default" head node server with respect to the network-enabled storage device, an available processing capacity of the "default" head node server, a physical location of the "default" head node server, or some combination thereof. In such embodiments, determining a processing capability requirement for the processing job can comprise determining that the "default" head node server for the network-enabled storage device does not have sufficient processing capability, network bandwidth, and/or data access capacity to meet the processing capability requirement for the processing job.

At 606, a network-attached server is identified with available processing capability to meet the processing requirement for the processing job. One or more servers attached to a computer network (i.e., network-attached servers) can be analyzed to determine their available processing capability. In at least some embodiments, a server workload monitor is configured to periodically and/or opportunistically scan the network-attached servers to determine their current processor utilizations, current network bandwidth utilizations, and/or current data access capacities. For example, a network-attached server can be accessed using a remote management protocol and queried to determine system utilization metrics for the network-attached server.

Additionally or alternatively, network latencies can be determined for network-attached servers with respect to the network-enabled storage device that is targeted by the processing job. In an embodiment where determining the processing capability requirement comprises determining a maximum acceptable latency for the processing job, identifying the network-attached server with available processing capability can comprise determining that a network latency of the network-attached server with respect to the network-enabled storage device is less than or equal to the maximum acceptable latency for the processing job.

In an embodiment where a "default" head node server is associated with the network-enabled storage device, and it is determined at 604 that the "default" head node server does not have sufficient computing resources to meet the processing capability requirement for the processing job, identifying a network-attached server with available processing capability can comprise identifying a network-attached server that, in combination with the "default" head node server, has sufficient available computing resources to satisfy the processing capability requirement.

At 608, the network-attached server is configured to interface with the network-enabled storage device via a computer network. Configuring the server to interface with the network-enabled storage device can comprise transmitting one or more commands to the network-attached server via the computer network. The network-attached server can be configured to process these one or more commands in order to associate the network-attached server with the network-enabled storage device. In so configuring the network-attached server, the network-attached server can be used as a head node server for accessing the network-enabled storage device via the computer network. For example, a service application can be executed on the network-attached server that is configured to receive the one or more commands and to update one or more internal data structures and/or one or more processing applications on the network-attached server to make the network-attached server functional as a head node server for the network-enabled storage device.

In a particular embodiment, a command is transmitted to the network-attached server that comprises a network identifier for the network-enabled storage device, and/or an identifier for the network-enabled storage device with which a network address for the network-enabled storage device can be located. The network-attached server processes the command, at least in part, by establishing a logical connection with the network-enabled storage device, through which the network-attached server transmits data block-level access commands to the network-enabled storage device.

At 610, the network-attached server is used to perform the processing job using the network-enabled storage device. The network-attached server can be configured to receive requests to perform one or more of the operations of the processing job via the computer network. In processing the received requests, the network-attached server can transmit one or more data block-level access commands to the network-enabled storage device via the computer network, and can receive one or more data block-level access responses from the network-enabled storage device via the computer network. The data block-level access commands and responses can conform to one or more block-level storage access protocols that are transmitted over a computer network. In a particular embodiment, the network-enabled storage device comprises a solid state storage device, and the requests and responses conform to an NVMe over Fabrics protocol. However, it will be appreciated that at least some of the techniques described herein can be performed using other network-based data access protocols.

In an embodiment where the network-enabled storage device is associated with a "default" head node server, the "default" head node server can be used to perform one or more of the processing job operations and the network-attached server can be used to perform an additional one or more of the processing job operations. For example, in performing the processing job, both the "default" head node server and the network-enabled storage device, configured at 608, can be used to transmit data block-level access commands to the network-enabled storage device via the computer network and/or to perform processing operations using data stored on the network-enabled storage device that is targeted by the processing job.

Figure 7:
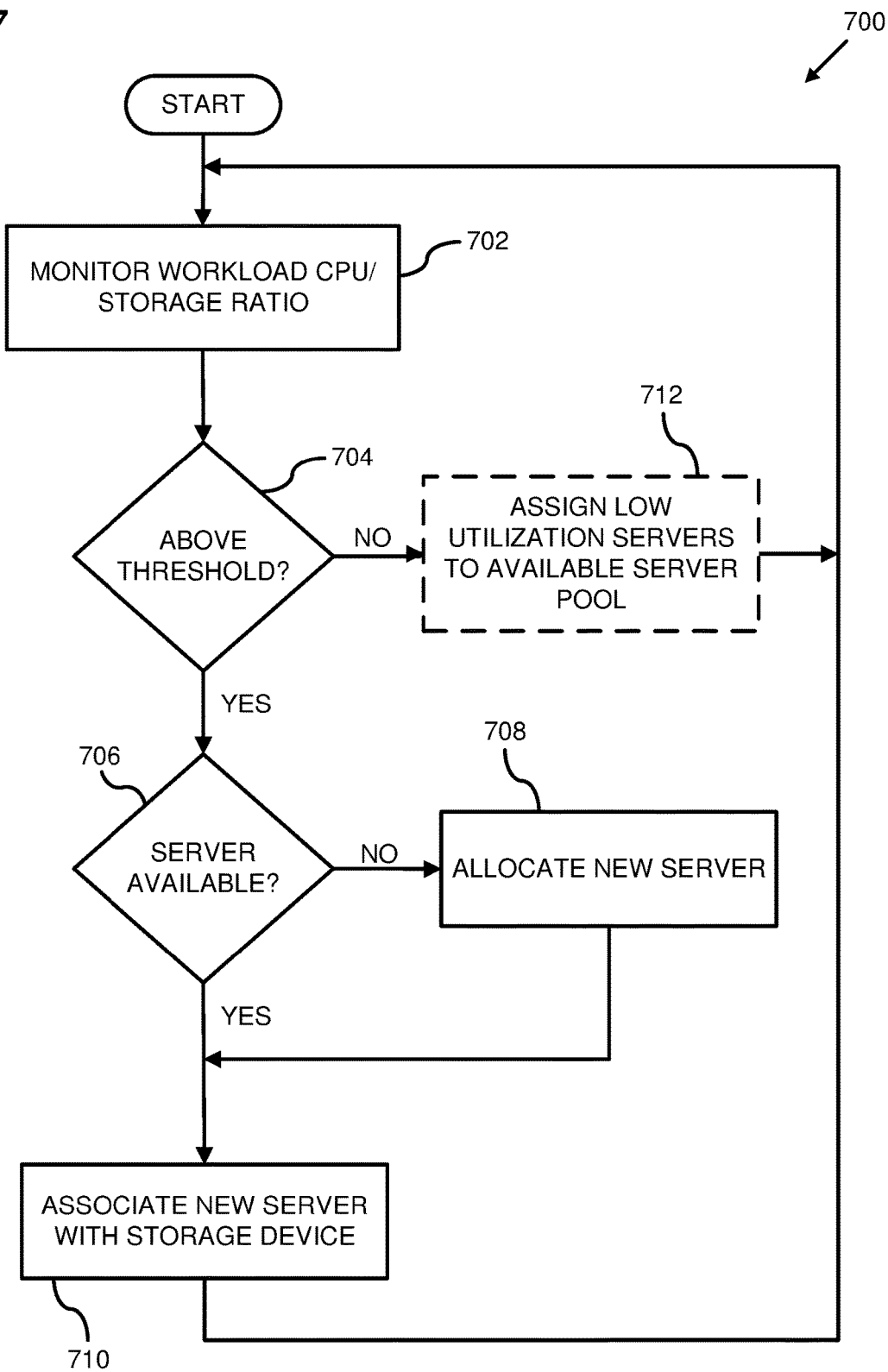
FIG. 7 is a flowchart of an example method for managing a workload CPU/storage ratio.

FIG. 7 is a flowchart of an example method 700 for managing a workload processor-to-storage ratio. Any of the example systems described herein can be used to perform he example system 700. For example, all or part of the example method 700 can be performed by a workload management server and/or one or more other network-attached server computers comprising a workload manager.

At 702, a processor-to-storage ratio for a compute workload is monitored. The processor-to-storage ratio can also be referred to as a CPU/storage ratio, although the one or more processors are not necessarily central processing units (CPUs). A compute workload can comprise data access and/or processing operations that are performed by one or more network-attached server computers targeting a given network-enabled storage device. For example, the one or more network-attached server computers can be server computers that are configured to act as head node servers for the network-enabled storage device by transmitting block-level access commands to the network-enabled storage device via a computer network.

Although the ratio is referred to as a "processor-to-storage ratio," in at least some embodiments utilizations of other resources can be monitored as well. For example, a memory requirement or the compute workload can be determined, and a processor-to-memory ratio for the compute workload can be monitored.

In at least some embodiments, the monitoring is performed periodically and/or opportunistically in order to ascertain a current ratio of computational resources of the one or more network-attached servers and/or a desired data access rate of the one or more processing jobs targeting the network-enabled storage device. Additionally or alternatively, the processor-to-storage ratio for the compute workload can be ascertained in response to receipt of a request to perform one or more additional data processing jobs targeting the network-enabled storage device. For example, in response to receipt of a request to perform a data processing job targeting the network-enabled storage device, an available processing capacity and/or data access capacity of the one or more network-attached servers currently acting as head node server(s) for the network-enabled storage device can be analyzed.

At 704, it is determined whether the processor-to-storage ratio for the compute workload is above a specified threshold. The specified threshold can be a value (such as a number, ratio, percentage, etc.) that indicates that the compute workload targeting the network-enabled storage device has exceeded (or is close to exceeding) available processing capability and/or storage access capacity of the one or more network-attached servers associated with the network-enabled storage device. In an embodiment where the monitoring at 702 to is triggered in response to receipt of a request to perform a data processing job targeting the network-enabled storage device, the determination at 704 can comprise determining that an additional estimated processing capability requirement of the requested data processing job would exceed available processing capability and/or storage access capacity of the one or more network-attached servers associated with the network-enabled storage device.

If the processor-to-storage ratio is above the specified threshold then, at 706, it is determined whether another network-attached server is available. In at least some embodiments, a list or pool of available network-attached servers is maintained. The list or pool of available network-attached servers can be searched to identify one or more network-attached servers with available processor and/or data access capacity. For example, a network-attached server in the pool or list of available servers can be identified that has available computing and/or network access resources that would be sufficient to bring the processor-to-storage ratio for the compute workload targeting the network-enabled storage device below the specified threshold. In an embodiment where the monitoring at 702 is triggered in response to receipt of a request to perform a processing job targeting the network-enabled storage device, one or more network-attached servers in the list or pool of available servers can be identified that, in combination with the one or more network-attached servers already associated with the network-enabled storage device, have sufficient processor and/or network access capacity to satisfy a processing capability requirement of the processing job. In at least some embodiments where a memory requirement of the compute workload is determined, available memory capacities of the one or more network-attached servers can be analyzed as part of the identification process.

If a network-attached server is not available then, at 708, a new network-attached server is allocated. Allocating a new network-attached server can comprise identifying a server computer with available computational and/or network access resources and instantiating a new virtual server (such as a virtual machine, virtualization container, etc.) on the identified server computer and configuring the instantiated virtual server to communicate via the computer network. The instantiated virtual server can comprise one or more processes that can be used to access one or more network-enabled storage devices via the computer network. In at least some embodiments where a memory requirement of the compute workload is determined, identifying the server computer can comprise identifying a server computer with an available memory capacity that can satisfy the memory requirement. In a particular embodiment, a type of virtual machine can be selected that has a processor and memory capacity configuration that can satisfy a processor-to-memory ratio of the compute workload. An instance of the selected virtual machine type can then be created on the identified server computer.

Allocating the new network-attached server can comprise allocating compute and/or network access resources of the server computer to the instantiated virtual server. In at least some embodiments, the amount of computing and/or network access resources allocated to the instantiated virtual server is based on an amount of computing and/or network access resources that is sufficient to bring the processor-to-storage ratio for the compute workload targeting the network-enabled storage device below the specified threshold. In a different or further embodiment, the amount of computing and/or network access resources allocated to the virtual server is based on an amount of processor capacity and/or data access capacity that is necessary to satisfy the processing capability requirement of the data processing job targeting the network-enabled storage device.

At 710, the available network-attached server is associated with the network-enabled storage device. Associating the available network-attached server with the network-enabled storage device can comprise configuring the available network-attached server to operate as a head node server for performing data access operations targeting the network-enabled storage device.

The available network-attached server can comprise one or more services configured to receive commands via a computer network to associate the network-attached server with one or more network-enabled storage devices. Upon receipt of such a command, the service can be configured to register a network-enabled storage device identified in the received command as a storage device that is logically connected to the available network-attached server. The network-attached server can be configured to communicate with the network-enabled storage device via the computer network as if the network-enabled storage device were physically connected to a communication bus of the network-attached server (for example, by a transmitting data block-level access requests to the network-enabled storage device via the computer network). In at least some embodiments, it can appear to applications executing on the network-attached server (and/or applications executing on one or more other servers connected to the computer network) as if the network-enabled storage device is connected directly to the network-attached server.

In at least some embodiments, the available network-attached server is registered as an available head node server for the network-enabled storage device. One or more operations of one or more data processing jobs targeting the network-enabled storage device can be routed to the available network-attached server for processing.

Optionally, if the processor-to-storage ratio is not above the specified threshold, at 712, one or more network-attached servers with low processor utilizations are assigned to an available server pool. For example, current processor utilizations for the one or more network-attached servers acting as head node servers for the network-enabled storage device can be determined. If a processor utilization for one of the network-attached servers indicates that the compute workload targeting the network-enabled storage device can be performed without the use of the network-attached server (and without causing the processor-to-compute ratio to exceed the specified threshold), the association between the network-attached server and the network-enabled storage device can be removed. The network-attached server can then be assigned to the available server pool. Subsequently, when a processor-to-storage ratio of a compute workload targeting the network-enabled storage device (or targeting another network-enabled storage device) exceeds the specified threshold, the network-attached server can be re-associated with the network-enabled storage device (or associated with the another network-enabled storage device).

Thus, in at least some cases, network-attached compute resources and network-enabled storage resources can be dynamically associated, and re-associated, according to changing compute workload demands.

In at least some embodiments, the processor-to-storage ratio for the compute workload can indicate that an available storage capacity of the network-enabled storage device is insufficient to complete the one or more processing jobs targeting the network-enabled storage device. In such a scenario, an additional network-enabled storage device can be dynamically associated with the one or more network-attached servers, such that the one or more network-attached servers can act as head node server(s) for the additional network-enabled storage device. The additional network-enabled storage device can subsequently be used to perform all or part of the processing job operations that make up the current compute workload.

Figure 8:
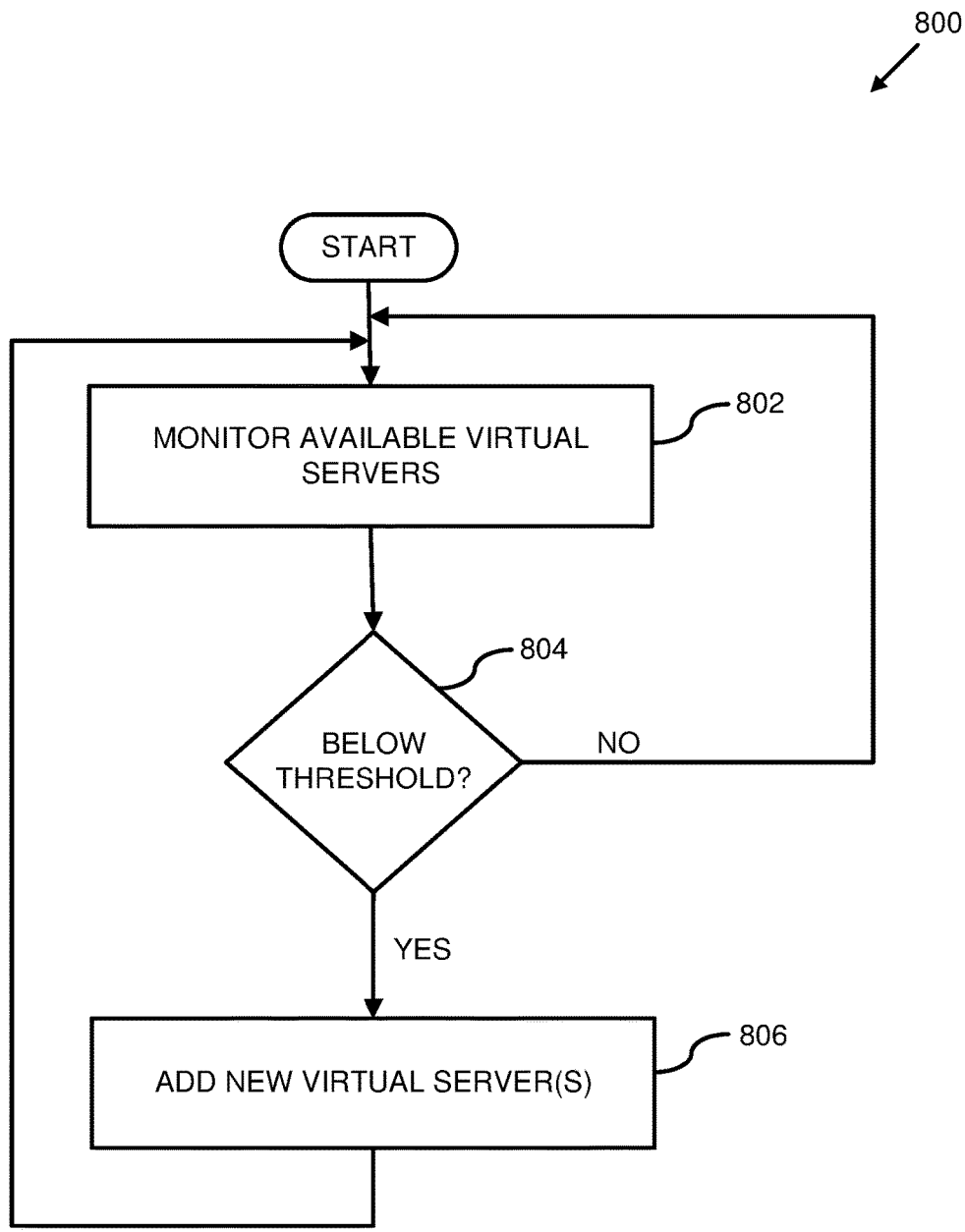
FIG. 8 is a flowchart of an example method for managing a pool of available virtual servers.

FIG. 8 is a flowchart of an example method 800 for managing a pool of available virtual servers. Any of the example systems described herein can be used to perform the example method 800. For example, all or part of the example method 800 can be performed by a workload management server and/or one or more other network-attached server computers comprising a workload manager.

At 802, a pool of available virtual servers is monitored. The pool of available servers can comprise a data structure (such as a table, array, etc.) storing identifiers for available virtual servers. In at least some embodiments, the data structure can associate the identifiers for the available virtual servers with available computing resources of the virtual servers.

At 804, it is determined whether a number of virtual servers in the pool of available virtual servers is below a specified threshold. The specified threshold can be set as a minimum number of virtual servers that should be available for allocation to network-enabled storage devices.

If the number of virtual servers in the pool is not below the specified threshold, then the monitoring continues at 802. If the number of virtual servers is below the specified threshold then, at 806, one or more new virtual servers is/are added to the pool of available virtual servers. Adding a virtual server to the pool of available virtual servers can comprise instantiating a new virtual machine (or virtualization container, etc.) on a network-attached server, and assigning the newly instantiated virtual machine (or virtualization container, etc.) to the pool of available virtual servers.

Additionally or alternatively, one or more virtual servers that have already been instantiated can be analyzed to determine if one or more of them can be added to the pool of available virtual servers. For example, a virtual server can be added to the available virtual server pool if it has a processor utilization (or average processor utilization) that is below a specified threshold, which indicates that the virtual machine is underutilized. In at least some embodiments, processor utilization rates for virtual servers be monitored and stored in a data structure, such as a table or the like. In such an embodiment, the rates can be analyzed to identify virtual servers that have processor utilizations below the specified threshold. One or more of the identified virtual servers can be added to the available virtual server pool. For example, network identifiers for the one or more virtual server can be added to a list or table of identifiers for virtual servers in the available virtual server pool.

Analyzing the virtual servers to determine if they can be added to the pool of available virtual servers can provide more current utilization metrics than analyzing utilization rates stored in a data structure, but in at least some cases can take more time, since the virtual servers must be polled via the computer network as part of the assignment process. Contrastingly, analyzing the utilization rates of the virtual servers periodically, and storing the utilization rates in a data structure, can increase the speed of the assignment process, but in some cases at least part of the stored utilization rate data may not be current when it is analyzed.

Assigning the virtual server to the pool of available virtual servers can comprise adding a network identifier for the virtual server to a list of network identifiers for available virtual servers. In at least some embodiments, the network identifier can comprise a network address, such as a MAC address, an IP address, an IP address and port number, or the like.

After the one or more new virtual servers are added to the available virtual server pool, the monitoring of the available virtual server pool continues at 802. In any of the examples described herein, one or more of the virtual servers in the available virtual server pool can be associated with one or more network-enabled storage devices, and used as head nodes for the one or more network-enabled storage devices to perform data processing operations targeting the one or more network-enabled storage devices.

Figure 9:
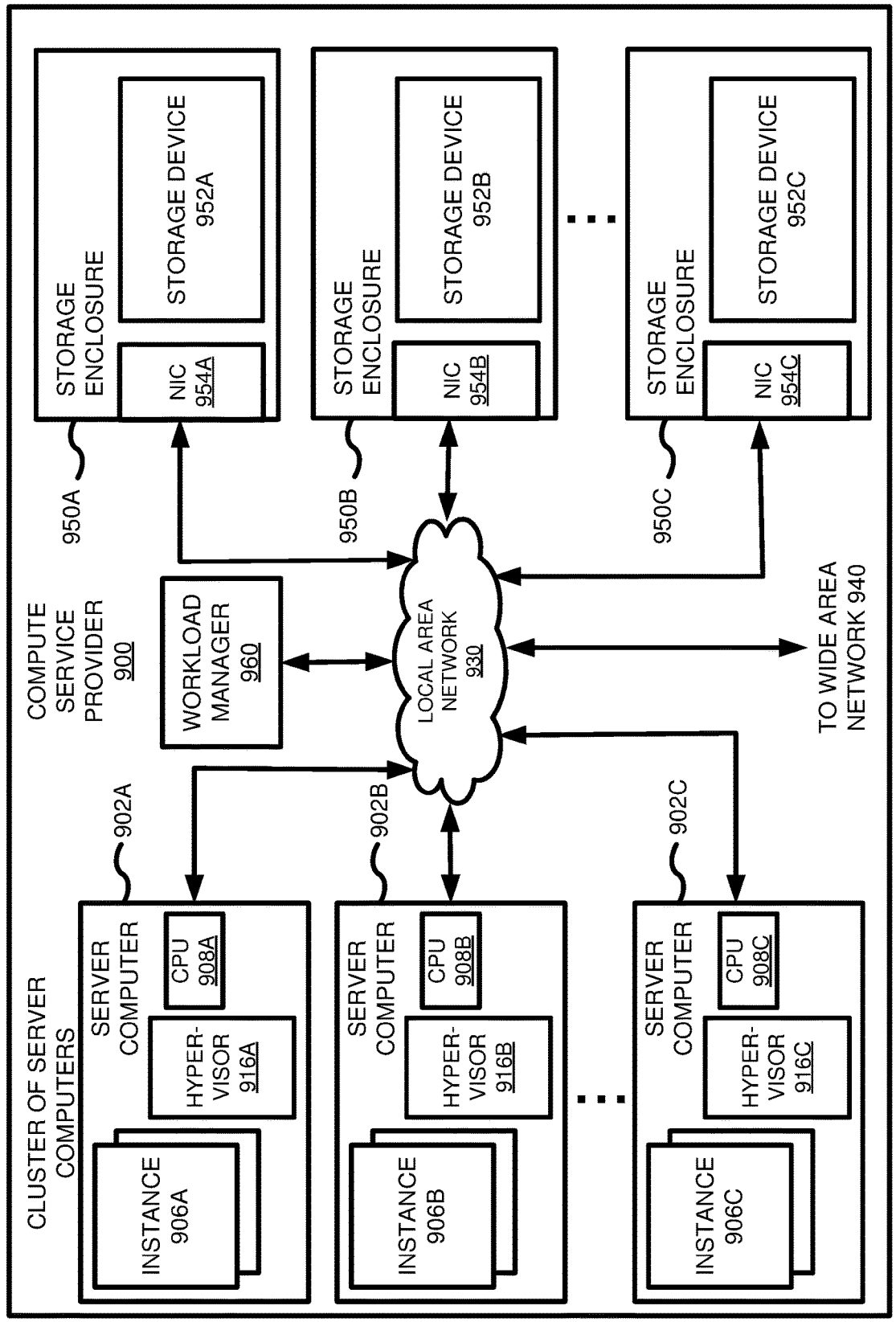
FIG. 9 is a system diagram depicting an example network-based compute service provider.

FIG. 9 is a system diagram showing an example network-based compute service provider 900 that illustrates one environment in which embodiments described herein can be used. The compute service provider 900 (i.e., the cloud compute environment) is capable of delivery of computing and storage capacity as a service to a community of end recipients.

In an example embodiment, the compute service provider can be established for an organization by or on behalf of the organization. That is, the compute service provider 900 may offer a "private cloud environment." In another embodiment, the compute service provider 900 supports a multi-tenant environment, wherein a plurality of customers operate independently (i.e., a public cloud environment). Generally speaking, the compute service provider 900 can provide the following models: Infrastructure as a Service ("IaaS"), Platform as a Service ("PaaS"), Software as a Service ("SaaS"), and/or scalable storage as a service. Other models can be provided. For the IaaS model, the compute service provider 900 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 900 using networked client devices, such as desktop computers, laptops, tablets, smartphones, etc. running web browsers or other lightweight client applications. Those skilled in the art will recognize that the compute service provider 900 can be described as a "cloud" environment.

The particular illustrated compute service provider 900 includes a plurality of server computers 902A-C. While only four server computers are shown, any number can be used, and large centers can include thousands of server computers. The server computers 902A-C can provide computing resources for executing software instances 906A-C. In one embodiment, the instances 906A-C are virtual machines. As known in the art, a virtual machine is an instance of a software implementation of a machine (i.e., a computer) that executes applications like a physical machine. In the example, each of the server computers 902A-C can be configured to execute a hypervisor (e.g., 916A-C) or another type of program configured to enable the execution of multiple instances 906 on a single server. For example, each of the servers 902A-C can be configured (e.g., via the hypervisor) to support one or more virtual machine partitions, with each virtual machine partition capable of running a virtual machine instance (e.g., server computer 902A could be configured to support three virtual machine partitions each running a corresponding virtual machine instance). Additionally, each of the instances 906 can be configured to act as a head node server for one or more of the network-enabled storage enclosures 950A-C, as described herein.

Each of the server computers 902A-C comprises one or more processors 908A-C that can be used to execute the one or more instances 906A-C. It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances. Each of the instances 906 can have an independent network address (e.g., IP address) with which the instance 906 can be accessed via the local area network 930. Data traffic can be communicated over the local area network 930. The local area network 930 can be connected to a wide area network (WAN) 940 so that end-users and/or applications connected to other networks can access the compute service provider 900. It should be appreciated that the network topology illustrated in FIG. 9 has been simplified and that many more networks and networking devices can be utilized to interconnect the various computing systems disclosed herein.

The compute service provider 900 comprises multiple storage enclosures 950A-C. Each of the storage enclosures 950 comprises one or more storage devices 952 and a network interface card 954 connected to the local area network 930. A storage enclosure 950 can be configured to receive data-block access commands via the network interface card 954 and to transmit the commands to the enclosed storage device(s) 952. The storage enclosure 950 can receive responses to the block-level access commands from the enclosed storage device(s) 952 and transmit the responses via the network interface card 954.

The compute service provider 900 comprises a workload manager 960 configured to monitor the instances 906A-C on the server computers 902A-C via the local area network 930. In at least some embodiments, the workload manager 960 can be configured to communicate with the instances 906A-C via a management plane of the local area network 930 that is separate from a data plane of the local area network that is used to transmit data communications. Monitoring the instances 906 A-C can comprise periodically and/or opportunistically monitoring compute resource utilizations of the server computers 902A-C and/or monitoring compute resource utilizations of the instances 906A-C. In at least one embodiment, the workload manager 960 can be configured to identify one or more of the server computers 902A-C that are underutilized and can add the one or more underutilized server computers 902A-C to an available server pool that is maintained by the workload manager 960.

The workload manager 960 can be configured to associate one or more of the instances 906A-C with one or more of the storage enclosures 950A-C. For example, in response to receiving a data processing job request targeting one or more of the storage devices 952A-C, the workload manager can search an available server pool comprising one or more of the server computers 902A-C and can determine available processing capability and/or data access capacities of the one or more servers in the available server pool. The workload manager 960 can be configured to identify one or more of the server computers 902A-C with an available processing capability and/or data access capacity that is sufficient to perform the data processing job. The workload manager 960 can be configured to associate the identified server computer with one or more of the storage enclosures 950A-C containing the one or more storage devices targeted by the data processing job request.

Additionally or alternatively, the available server pool can comprise one or more of the instances 906A-C. The workload manager 960 can be configured to identify one or more of the instances 906A-C with an available processing capability and/or data access capacity that is sufficient to perform all or part of the data processing job. The workload manager 960 can be configured to associate the identified instance with one or more of the storage enclosures 950A-C containing the one or more storage devices targeted by the data processing job request. In at least one embodiment, the workload manager 960 can determine that no instances in the available server pool are available that have sufficient processing and/or data access resources to perform the data processing job. In such an embodiment, the workload manager can be configured to instantiate one or more additional instances on one or more of the server computers 902A-C.

Figure 10:
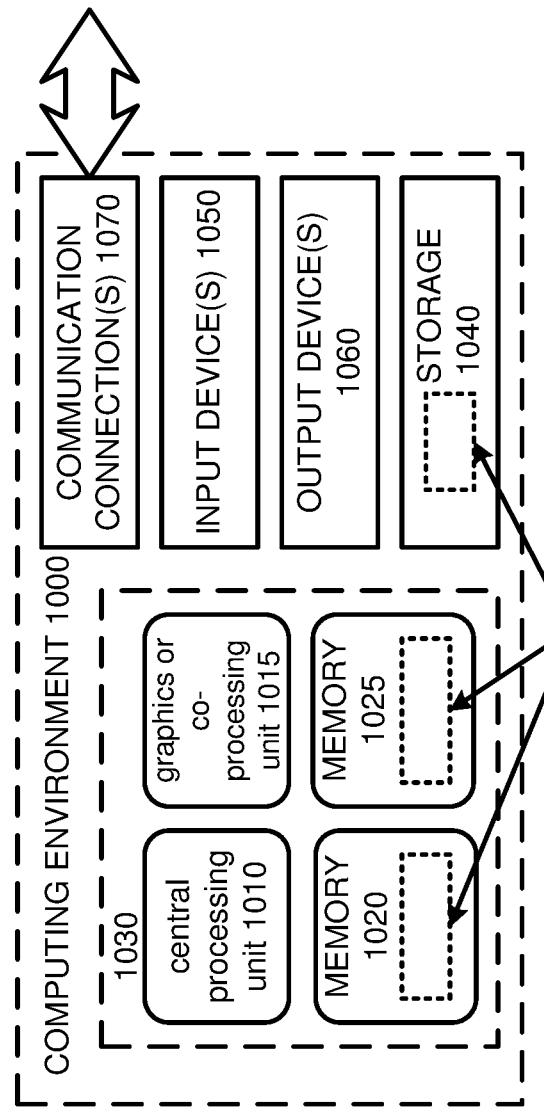
FIG. 10 depicts a generalized example of a suitable computing environment in which the described innovations may be implemented.

FIG. 10 depicts a generalized example of a suitable computing environment 1000 in which at least some of the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing capability. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

In at least some embodiments, the computing environment 1000 can be a network-attached server, or workload management server as described herein.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device (s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. The one or more communication connections 1070 can be used to communicate with one or more network-attached servers, one or more network-enabled storage devices, and/or a workload manager, via a computer network as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We claim as our invention all that comes within the scope of the following claims.

What is claimed is:

1. A system for a networked storage architecture, the system comprising:
   a first head node server connected to a computer network, wherein the first head node server is configured to transmit data block-level access commands to a storage device via the computer network;
   a second head node server connected to the computer network;
   the storage device connected to the computer network, wherein the storage device comprises a network interface and a storage medium; and
   a workload management server computer, configured to:
      receive a request to perform a data processing job targeting the storage device;
      determine that a processing requirement of the data processing job exceeds an available processing capacity of the first head node server;
      associate the second head node server with the storage device, wherein associating the second head node server with the storage device comprises configuring the second head node server to transmit data block-level access commands to the storage device via the computer network; and
      use the first head node server and the second head node server to perform the data processing job targeting the storage device, comprising transmitting data access commands for a first part of the data processing job from the first head node server and transmitting data access commands for a second part of the data processing job from the second head node server.

2. The system of claim 1, wherein:
   the second head node server comprises a virtual machine configured to transmit the data block-level access commands to the storage device; and
   the workload management server computer is further configured to instantiate the virtual machine on the second head node server.

3. The system of claim 1, wherein the workload management server computer is further configured to:
   determine that a storage requirement of the data processing job exceeds an available storage capacity of the storage medium in the storage device;
   configure the first head node server to transmit data block-level access commands to a second storage device via the computer network, the second storage device comprising a second storage medium; and
   wherein the performing the data processing job comprises using the first head node server to store data in the storage medium in the storage device and to store additional data in the second storage medium in the second storage device.

4. The system of claim 1, wherein the workload management server computer is further configured to:
   monitor a processor utilization of the second head node server;
   determine that the processor utilization of the second head node server is below a specified threshold;
   remove the association between the second head node server and the storage device; and
   assign the second head node server to an available server pool.

5. The system of claim 1, further comprising a server rack, wherein the server rack comprises:
   a top-of-rack switch; and
   the storage device, wherein the network interface of the storage device is connected to a port of the top-of-rack switch.

6. The system of claim 1, wherein the storage device further comprises a network data block access controller, configured to:
   receive a block-level access request via the network interface;
   process the block-level access request, wherein processing the block-level access request comprises accessing one or more data blocks in the storage medium; and
   transmit a block-level access response via the network interface.

7. A system, comprising:
   a storage device connected to a computer network, wherein the storage device comprises a storage medium and a network interface, wherein the storage device is configured to receive data block access commands targeting data blocks stored on the storage medium via the computer network using the network interface;
   a server connected to the computer network, wherein the server comprises a processor and a second network interface, wherein the server is configured to transmit data block access commands to the storage device via the computer network using the second network interface;
   another server connected to the computer network, wherein the another server comprises another processor and a third network interface, wherein the another server is configured to transmit data block access commands to the storage device via the computer network using the third network interface; and
   a workload management server computer, configured to:
      determine a compute power to data storage ratio for a compute workload targeting data stored on the storage medium of the storage device; and
      allocate the server and the another server to the compute workload, wherein the allocating comprises configuring the server to perform a first part of the compute workload, and configuring the another server to perform a second part of the compute workload, by transmitting data block access commands to the storage device via the computer network using the second network interface and the third network interface.

8. The system of claim 7, wherein the workload management server computer is further configured to:
   detect that a processing utilization of the server is below a specified threshold; and
   add the server to a pool of available servers;
   wherein the allocating the server to the compute workload comprises identifying the server in the pool of available servers.

9. The system of claim 7, wherein the workload management server computer is further configured to:
   determine a latency sensitivity requirement of the compute workload; and
   wherein the allocating the server and the another server to the compute workload comprises determining that a network latency of the server with respect to the storage device satisfies the latency sensitivity requirement of the compute workload.

10. The system of claim 9, wherein the determining that the network latency of the server with respect to the storage device satisfies the latency sensitivity requirement of the compute workload comprises:

determining that the server and the storage device are directly connected to a same network switch.

11. The system of claim 7, wherein the storage device comprises a network interface controller configured to:
receive a block storage access request via the computer network using the network interface;
responsive to receiving the block storage access request, retrieve data from the storage medium of the storage device; and
transmit the retrieved data via the computer network.

12. The system of claim 7, wherein the workload management server computer is further configured to:
monitor a pool of servers comprising the server and the another server; and
wherein the allocating the server and the another server to the compute workload comprises:
analyzing available processing capacities of the servers in the pool of servers; and
determining that the server and the another server have available processing capacities to perform at least part of the compute workload.

13. The system of claim 7, wherein the server comprises a virtual machine, and the allocating the server and the another server to the compute workload further comprises allocating the virtual machine to the compute workload.

14. The system of claim 13, wherein the workload management server computer is further configured to instantiate the virtual machine on the server.

15. The system of claim 14, wherein the workload management server computer is further configured to:
monitor a pool of underutilized virtual servers;
determine that a number of virtual servers in the pool of underutilized virtual servers is below a specified threshold;
instantiate the virtual server on the server responsive to the determining that the number of virtual servers is below the specified threshold; and
add the instantiated virtual server to the pool of underutilized virtual servers.

16. A method, comprising:
receiving a request to perform a data processing job using a network-enabled storage device;
determining a processing capability requirement for the data processing job;
identifying a first network-attached server and a second network-attached server with available processing capabilities to meet the processing capability requirement;
configuring the first network-attached server to interface with the network-enabled storage device via a computer network;
configuring the second network-attached server to interface with the network-enabled storage device via the computer network; and
using the first network-attached server to perform a first part of the data processing job using the network-enabled storage device and using the second network-attached server to perform a second part of the data processing job using the network-enabled storage device.

17. The method of claim 16, wherein the identifying the first network-attached server and the second network-attached server with available processing capabilities comprises:
searching an available server pool comprising the first network-attached server and the second network-attached server in a cloud compute environment; and
determining the available processing capabilities of the first network-attached server and the second network-attached server.

18. The method of claim 17, further comprising:
monitoring utilization of server computers in the cloud compute environment;
determining that one of the server computers has a utilization below a specified threshold; and
assigning the server computer to the available server pool.

19. The method of claim 17 further comprising:
monitoring the available server pool;
determining that a number of available servers in the available server pool is below a specified threshold;
instantiating a new virtual machine; and
assigning the new virtual machine to the available server pool.

20. The method of claim 16, wherein:
the determining the processing capability requirement comprises determining a maximum acceptable latency for the data processing job; and
the identifying the first network-attached server and the second network-attached server comprises determining that a network latency of the first network-attached server with respect to the network-enabled storage device is less than or equal to the maximum acceptable latency for the data processing job.

* * * * *